Dec. 12, 1933.　　　　K. C. McCUTCHEON　　　　1,938,708
BURNER
Filed May 4, 1929　　　　4 Sheets-Sheet 1
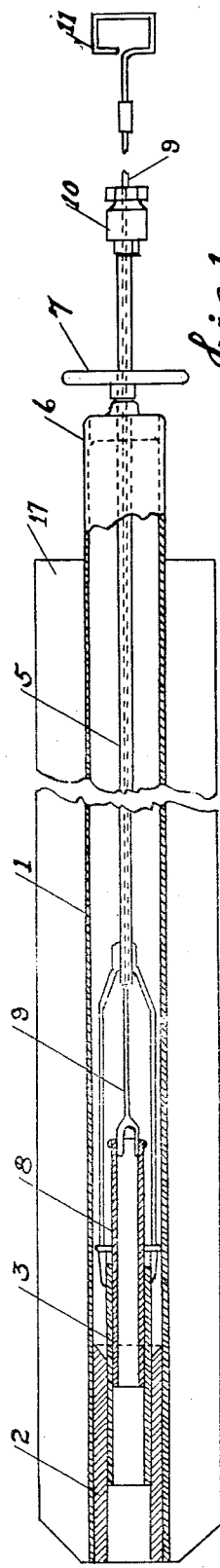
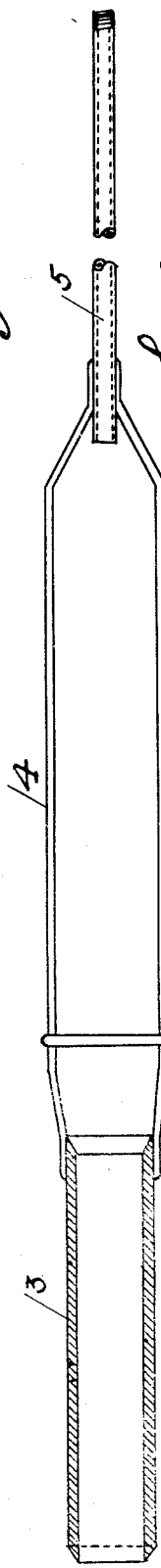
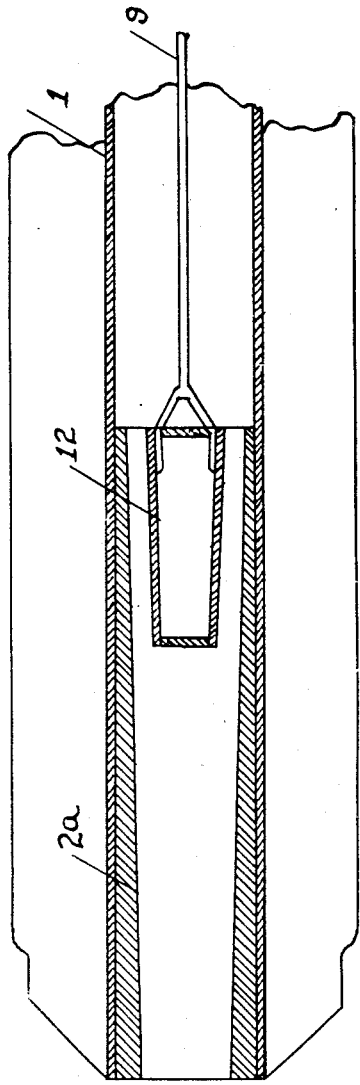
INVENTOR.
Kenneth C. McCutcheon
BY Allen & Allen
ATTORNEYS.

Dec. 12, 1933. K. C. McCUTCHEON 1,938,708
BURNER
Filed May 4, 1929 4 Sheets-Sheet 2
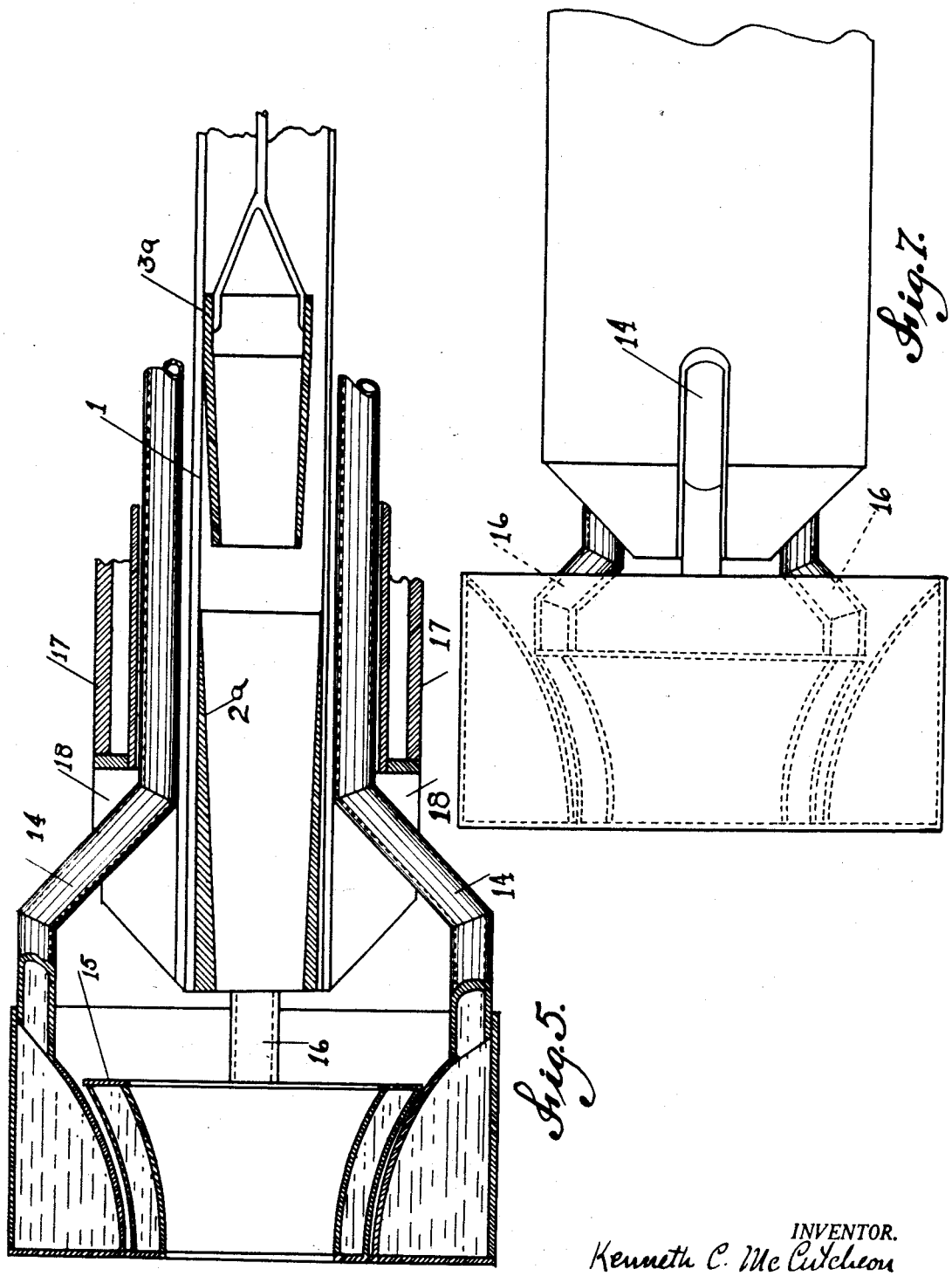
INVENTOR.
Kenneth C. McCutcheon
BY Allen & Allen
ATTORNEYS Dec. 12, 1933.  K. C. McCUTCHEON  1,938,708
BURNER
Filed May 4, 1929  4 Sheets-Sheet 3

INVENTOR.
Kenneth C. McCutcheon
BY Allen & Allen
ATTORNEYS.

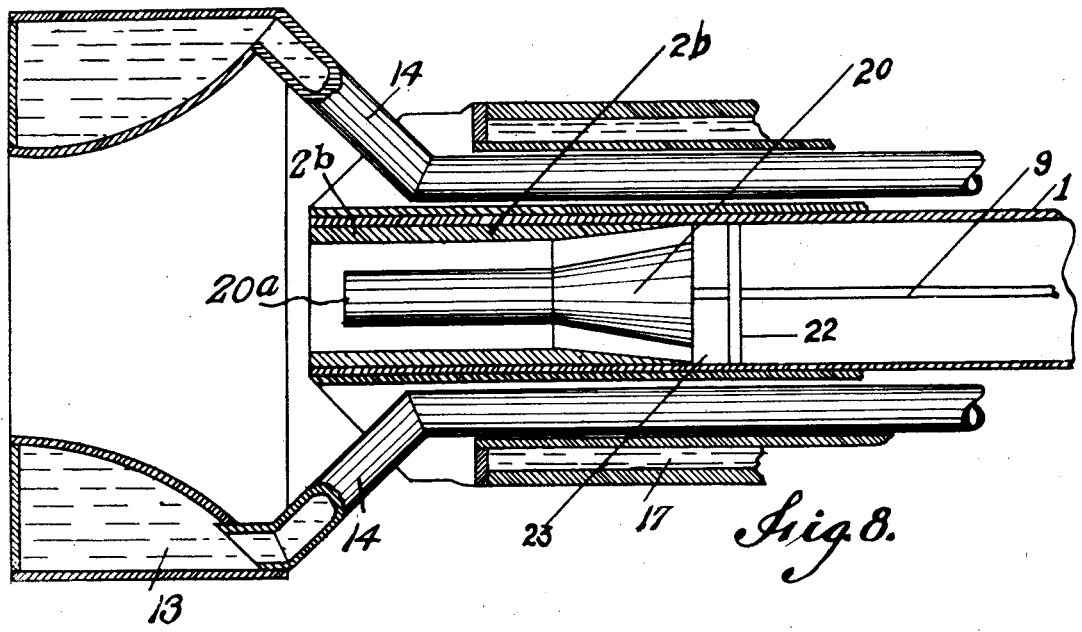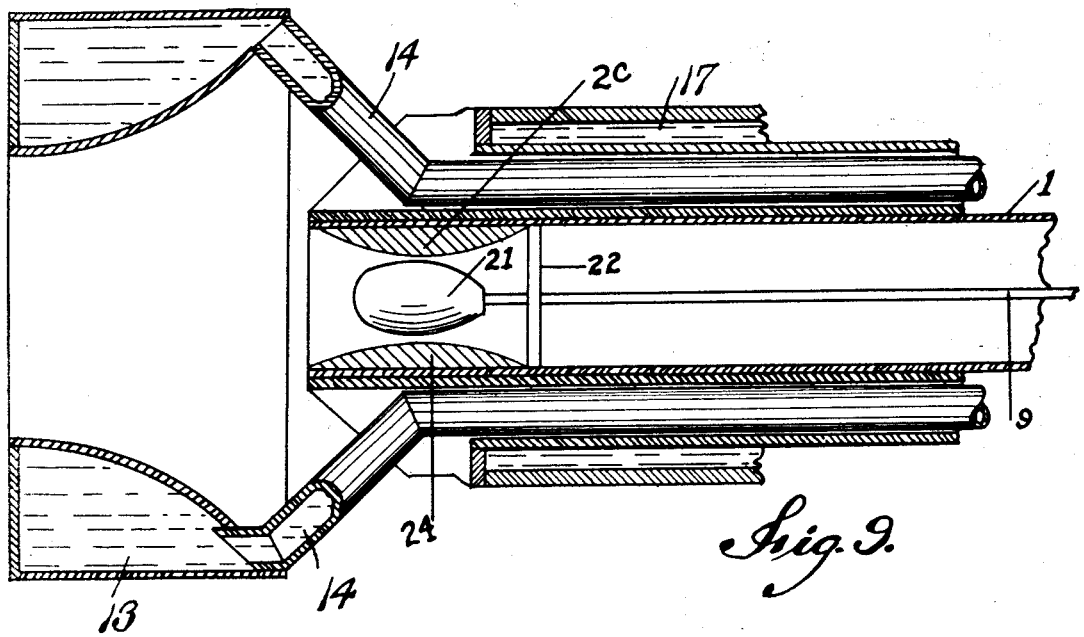

Patented Dec. 12, 1933

1,938,708

UNITED STATES PATENT OFFICE 1,938,708

BURNER

Kenneth C. McCutcheon, Ashland, Ky., assignor to The American Rolling Mill Company, Middletown, Ohio, a corporation of Ohio Application May 4, 1929. Serial No. 360,497

12 Claims. (Cl. 158—99)

It is an object of my invention to provide an improved type of burner which may be used without change for a number of different types of fuels, such as gas, oil, tar and the like.

It is a further object of my invention to provide a type of burner in which the energy for the fuel discharge, the air injection, and the mixing of fuel and air is supplied entirely or in part by the fuel.

It is still another object of my invention to provide a burner in which very careful control is obtainable and consequently a fine regulation of combustion conditions.

It is still another object of my invention to provide a type of burner particularly adapted to use in furnaces which use preheated air for combustion, reversible or otherwise, such as heating furnaces, glass furnaces, open hearth furnaces, and the like.

The positive problem in existing metallurgical furnaces is largely concerned with the proper mixture of the fuel with the air. Numerous attempts, successful and otherwise, have been made or are being made to accomplish this mixing by the restriction of the port or opening through which the flame enters the furnace. This restriction of the incoming port area results in improved combustion conditions; but inasmuch as the incoming port must, upon the next reversal, become an exodus port, carrying air and high temperature products of combustion, it has been found necessary to use a large amount of water cooling, and to modify the shape and lines of this port accordingly.

Also, if this port is restricted as much as is desirable for an inlet port, when it becomes an outlet port, it resists the proper rapid evacuation of the products of combustion to the detriment of the furnace structure. Recognizing this, dampers have been placed at various locations in the furnace system whereby the areas are restricted, or the port predicated. These methods are in the right direction and some such method may eventually be devised that will prove thoroughly practical.

If compressed air is used in the burner, the air itself is expensive and displaces the same amount of combustion air which should come in preheated, to the detriment of flame temperature. If steam is used, it removes heat from the hearth and has a bad effect on the brick work. It will be seen therefore that it is distinctly advantageous to provide a burner in which the energy for mixing comes from the fuel itself.

By the use of my burner, however, it is possible to accomplish the necessary mixture of air and fuel to the desired amount without restriction of the furnace ports, inasmuch as the energy of the fuel is sufficient both for the mixture of fuel and air and for the direction of the flame.

As anyone familiar with the art knows, in the scrap and pig iron process, the duration of a heat can be divided into a number of periods. These periods cannot be distinctly defined, as they shade gradually from one to the other but, generally speaking, they can be called, the melting period, the lime-boil period, the working period and the refining period, after which the bath is tapped.

During the melting period and until the lime-boil starts, the fuel demand of the furnace is high and there is a definite ratio between air and fuel.

During the lime-boil period, the amount of gas required is less than during the melting period and due to the evolution of combustible gases from the bath, more air must be supplied than that required to burn the fuel gas alone.

During the working period, the fuel demand of the furnace is somewhat higher than during the lime-boil period.

During the refining period, the demand for fuel is only enough to keep the bath molten and the air ratio is about as required during the melting period.

At all times it is desirable to carry exactly the right character of flame, and to this end my invention is directed to the production of a burner which will give the required control.

These and other objects of my invention which will be pointed out hereinafter or will be apparent to one skilled in the art upon reading these specifications, I accomplish by that certain construction and arrangement of parts of which I shall now describe a preferred embodiment, reference being had to the drawings which accompany this application.

In these drawings:

Figure 1 is a cross sectional view of one form of fuel inlet or delivery showing means for controlling the jet.

Figures 2 and 3 are details of the movable hollow plugs of this type of fuel inlet.

Figure 4 shows a different type of fuel inlet and control.

Figure 5 is a detail of my burner assembly in the closed position shown as embodying still another type of fuel inlet.

Figure 7 is a view partly in plan and partly in section of the burner assembly.

Figures 8 and 9 are sectional views through complete burners, omitting the supplementary head, and having types of fuel inlet jet control which differ from those of Figures 1, 4 and 5.

Figure 6:
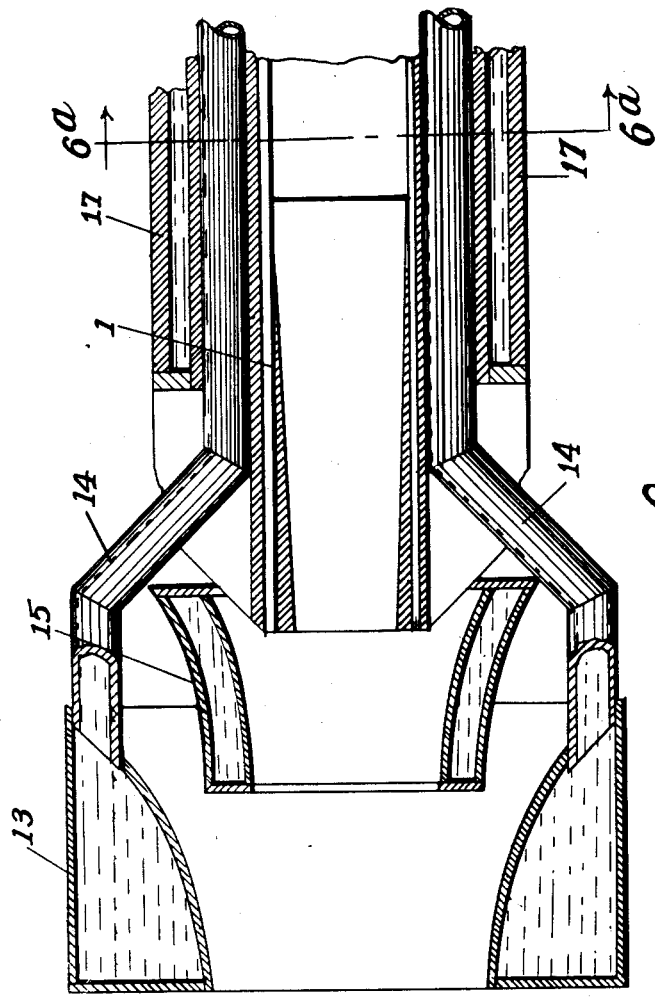
Figure 6 is a sectional view of my burner in open position.
Figure 6A:
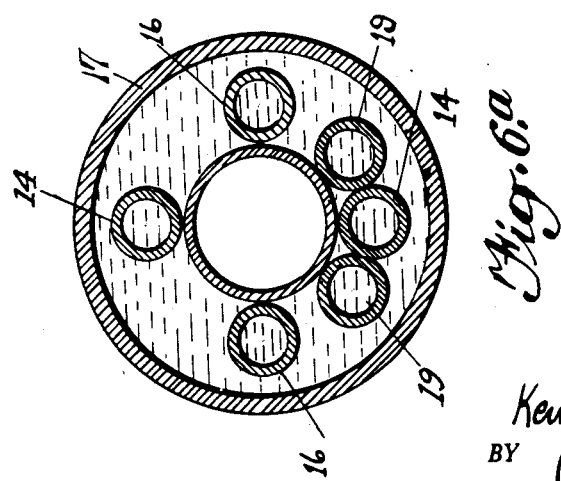
Figure 6a is a cross section on the line 6a—6a of Figure 6.

In my burner I employ the use of the aspirator principle for introducing air. I provide a central jet or nozzle for the introduction of fuel and ahead of this I provide variable means whereby the aspirator jet, utilizing the energy of the fuel, may be caused to draw in the preheated air from the regenerators or the recuperator and mix it thoroughly with the fuel charge. To take up first the fuel inlet I have shown in Figure 1 a nozzle comprising a pipe 1 having an interior nozzle-forming bushing at 2 at one end. Within this nozzle bushing there is a first control bushing 3 which is in the shape of a tube fitting within the bushing 2 and attached to rods 4. These rods form a fork to hold the tube, and they are attached to a smaller tube 5, which passes out through the end of the fuel inlet tube 1, and through a cap 6, which may be furnished with a bushing or gland. A wheel 7 may be caused to move the second bushing 3 within the fuel tube as will be readily understood. A second jet controlling bushing comprises a tube 8 held by a narrow forked rod 9 passing through the tube 5, which at the end thereof, may be fitted with a gland 10. The rod 9 may be fitted with a handle 11 for operation. It will now be readily understood from Figures 1, 2 and 3 how the construction of this fuel intake permits the variation of the nozzle and the jet thrown thereby. The fuel will of course be introduced into the tube 1 under pressure.

In Figure 4 the tube 1 is fitted with a nozzle bushing 2a which in this instance is tapered. The rod 9 bears a plug 12 which is in the form of a truncated cone, and which may be advanced into or withdrawn from the tapered bushing so as to increase or decrease the effective area of the fuel outlet as well as to vary the type of jet thrown by the nozzle.

Figures 8 and 9 show additional means for controlling the velocity, shape and amount of the fuel stream. In Figure 8, the tube 1 is fitted with a bushing 2b through which the fuel is caused to issue in an annular form. The bushing is partly conical and partly cylindrical within, as shown. The fuel is caused to issue in an annular jet by means of a taper plug 20 which has a cylindrical extension 20a. The plug is moved into and out of the bushing by the rod 9, and is held centrally of the opening by means of a centering device 22. It will be evident that the rate of fuel flow is controlled by varying the area of the ring-shaped opening at the point marked 23, between the surfaces of unequal taper on the bushing 2b and the plug 20 respectively.

In Figure 9, the tube 1 is fitted with the nozzle bushing 2c, any radial cross section of which is of arcuate shape within. The smallest internal area is at the point marked 24, and this point, if desired, may be very close to the end of the burner body. This area may be more or less restricted by moving the plug 21, which may be described as approximately barrel shaped, so that the point 24 will always be the point of minimum effective internal area of the nozzle, in combination with the arcuate exterior of the plug 21. The plug, when advanced into the bushing, may constrain the gas to issue from the nozzle in an annular jet; if desired, by withdrawal of the plug, the fuel may be permitted to issue in a solid jet. As in the other nozzle form, the plug 21 will be manipulated by the rod 9, centered in the nozzle by the device 22.

In my burner I effect the injection of the preheated air from the up-takes by causing the jet thrown by the fuel nozzle to pass through a head, provided with a restricted tapering opening. This head is indicated at 13 in Figures 5 and 6 and it will be seen that it is in the form of a hollow shell designed to be water cooled and connected with and held in place by water tubes 14 which extend back along opposite outer sides of the fuel tube 1. The interior portion of this angular shell has a converging arcuate cross section as will be readily understood. I next provide a second or supplementary aspirating or mixing head 15 which is also in the shape of an arcuate shell, the outer surface of which is shaped to fit within the central opening of the head 13, the inner opening of the second or supplementary head 15 also having a converging arcuate shape. It is a part of my invention that this supplementary head may be omitted. The head 15 is hollow for water cooling purposes and is connected with two water pipes 16, which also lie along the fuel inlet tube in the position shown, which is offset, say, 90° from the position of the tubes 14. The tubes 16 are used as operating devices for the supplementary head 15, and by manipulation of these tubes the supplementary head 15 may be advanced into contact with the main head 13 or withdrawn therefrom; and it will be understood that the fuel injection tube may also be provided with a water jacket indicated at 17 which will be notched as at 18 for the passage of the tubes 14, and elsewhere as will readily be understood, for the passage of the tubes 16. The water jacket may be, and preferably is fitted to leave a space around the fuel pipe 1 through which (Figure 6) may pass the tubes 14 and 16. Water tubes 19 may also be placed within and terminating in the water jacket 17 to carry cooled water to the forward end thereof, the water returning through the remainder of the jacket. It will be understood that suitable connections for water inlet and outlet are made to the jacket 17 and to the tubes 14 and 16. Not only the supplementary head 15 but also the main head 13 may be made adjustable with reference to the nozzle end of the fuel inlet tube 1, the adjustment being effected by means of the several tubes. It will further be understood that these tubes extend out through the end of the water jacket 17 and are equipped where necessary, with flexible connections or hoses to permit adjustment.

In the operation of my burner, I have several means of control. In the first place, I may control the pressure of fuel introduced into the tube 1. I may then control the nature of the jet thrown by the nozzle of the said tube by a manipulation of the several bushings in Figure 1, or the bushing and plug of Figures 4, 8 and 9. In Figures 5 and 6 I have shown a type of fuel inlet tube with the tapered bushing 2a and a second tapered bushing 3a which is, however, not a plug, but is hollow. With the plug type of burner shown in Figure 4, 8, and 9, I may increase or decrease the nozzle area and consequently the fuel consumption without making any change in the nozzle exit velocity, and consequently any change in the effectiveness of mixing. In the other types of burner shown I may vary the size of the aspirating nozzle area.

The amount of air drawn into the stream of moving fuel will be determined by the position of the head 13 and the supplementary head 15, relative to each other and to the nozzle-forming bushings 22a, 22b and 22c in the several figures. Where the supplementary head 15 is advanced into the main head, 13, the effective area of the opening in 13 is changed. Where the supplementary head 15 lies between the main head 13 and the fuel inlet nozzle, air will be drawn in to the moving fuel stream and mixed therewith in a double increment, i. e., my burner may embody a multi-jet principle. It will be clear that I may throughout my burner affect the amount of air drawn into the gas or other fuel stream by a change of position and not by a change in area effective for the passage of air. There is a critical relation between the areas of the fuel nozzle and the aspirating nozzle or mixer head within a range of fuel pressures. There is also a critical position of the fuel nozzle with respect to the aspirating nozzle for maximum efficiency of aspiration. In view of this I have made my mixer head or aspirating nozzle movable with respect to the fuel nozzle so that the proportions of air to fuel can be changed within the permissible range as desired even with a given relation between areas.

The mixer head or aspirating nozzle has also been made movable in order to introduce the flame into the air stream at the proper point to obtain the added direction to the flame and added mixing with the air.

It is also in view of these critical relationships that I have provided mechanical means to vary the area of the fuel nozzle. The critical adjustments attainable within the burner itself by means of the movable bushings or plugs make possible the regulation of the rate of fuel flow at the proper velocity for proper mixing effect and also the changing from one fuel to another. With a given velocity of fuel issuing from the fuel nozzle and a given position of aspirator head or heads, it will be desirable at times to vary the distance to which the burner extends into the furnace up-take, and control thereby the character of the flame by means of the known supplementary mixing effect of the fuel stream issuing from the mixer head with the air stream going to the furnace proper. I thus preferably make my entire burner assembly adjustable with regard to the furnace opening.

For different types of fuel and different desired rates of fuel consumption, modifications in the size of the various parts of my burner may be made if desired; but the moving telescopic bushings or tubes shown in Figures 1, 2 and 3, as well as the movable bushings in Figures 4, 8 and 9, are intended to accomplish the same purpose. As an exemplary illustration; if it is desired to turn into the furnace 50,000,000 B. t. u. per hour with natural gas, the gas is sent in through the bushing 8, i. e., with all the bushings pushed home. If it is desired to turn into the furnace 75,000,000 B. t. u. per hour with natural gas, the bushing 8 is drawn back so that the gas issues through bushing 3. If, however, it is desired to turn into the furnace 75,000,000 B. t. u. per hour with by-product coke oven gas, bushings 3 and 8 are both drawn back, and the gas issues from the bushing 2 at the same velocity, and with equivalent aspirating efficiency, as the natural gas was issuing from the bushing 3.

Moving the plug 20 of Figure 8, the plug 21 of Figure 9, and the plug 12 of Figure 4, will accomplish the same result.

For the introduction of oil or tar, the movable bushings or plugs may be removed if desired, and the atomized fuel introduced through the tube 1 by means of a pipe extending as close as may be desired to the mixing head.

Various other modifications may be made in my apparatus without departing from the spirit of my invention. My invention further contemplates the use of heat resistant alloys for burner body, mixer heads, bushings, plugs, and supports.

The following ratios between aspirating nozzle area and fuel nozzle area will be found advisable:

Oil and tar_____between 100 and 150 to 1
Natural gas_____between 50 and 100 to 1
By-product coke gas___between 25 and 50 to 1, with the following limiting lineal velocities of fuels through the fuel or burning nozzle:

Oil and tar_____10,000 ft. per minute.
Natural gas_____35,000 ft. to 60,000 per minute.
By-product coke gas___35,000 ft. to 60,000 ft. per minute.

A final relation of from 400 to 600 to 1 between furnace port area proper and fuel nozzle area in the case of gaseous fuels is advantageous.

Having thus described my invention, what I claim as new and desire to secure by Letters Patent, is:—

1. In a burner a fuel nozzle comprising a tube and a bushing movable within said tube to vary the nature of the fuel jet thrown thereby, a head positioned forwardly of said nozzle and adapted to form an aspirator therewith, and a supplementary aspirator-forming head located movably between said head and said nozzle.

2. In a burner a fuel nozzle comprising a tube and a bushing, means movable within said tube to vary the nature of the fuel jet thrown thereby, a head positioned forwardly of said nozzle and adapted to form an aspirator therewith, and a supplementary aspirator-forming head located movably between said head and said nozzle, said head and said supplementary head being water cooled.

3. In a burner a fuel nozzle comprising a tube and a bushing movable within said tube to vary the nature of the fuel jet thrown thereby, a head positioned forwardly of said nozzle and adapted to form an aspirator therewith, and a supplementary aspirator-forming head located movably between said head and said nozzle, the movement of said supplementary head adapted in one position to modify the aspirating action of the main head and in other positions to act as a supplementary aspirator-forming head, whereby air may be drawn into and mixed with the fuel stream at two points in the travel thereof.

4. In a burner, a tube forming a fuel inlet, a bushing in said tube forming a nozzle and means movable within said tube to and away from said bushing to vary the character of the stream thrown by said nozzle at any given pressure, said means comprising a plurality of telescopic independently movable tubes.

5. In a burner, a tube comprising a fuel inlet and having a nozzle, a water cooled head having inlet and outlet pipes lying parallel with said fuel inlet tube and forming the means whereby the position of said head may be adjusted with relation to said nozzle.

6. In a burner, a tube comprising a fuel inlet and having a nozzle, a water cooled head having inlet and outlet pipes lying parallel with said fuel inlet tube and forming the means whereby the position of said head may be adjusted with relation to said nozzle, a second supplementary head lying between said main head and said nozzle, also water cooled, and fitted with water inlet and outlet pipes lying along said fuel inlet tube and forming the means whereby said supplementary head may be adjusted, both of said heads forming an aspirator construction.

7. In a burner, a tube comprising a fuel inlet and having a nozzle, a water cooled head having inlet and outlet pipes lying parallel with said fuel inlet tube and forming the means whereby the position of said head may be adjusted with relation to said nozzle, a second supplementary head lying between said main head and said nozzle, also water cooled, and fitted with water inlet and outlet pipes lying along said fuel inlet tube and forming the means whereby said supplementary head may be adjusted, both of said heads forming an aspirator construction, and a water jacket surrounding said fuel inlet tube and said movable water cooling tubes.

8. In a burner, a tube comprising a fuel inlet and having a nozzle, a water cooled head having inlet and outlet pipes lying parallel with said fuel inlet tube and forming the means whereby the position of said head may be adjusted with relation to said nozzle, a second supplementary head lying between said main head and said nozzle, also water cooled, and fitted with water inlet and outlet pipes lying along said fuel inlet tube and forming the means whereby said supplementary head may be adjusted, both of said heads forming an aspirator construction, a water jacket surrounding said fuel inlet tube and said movable water cooling tubes, and means for varying the jet thrown by said nozzle comprising a bushing, and means in said fuel inlet tube variable in position with relation to said bushing.

9. In a burner, the combination of a nozzle, and a head forming an aspirator, said head surrounding and spaced from said nozzle and water-cooled, and said nozzle opening out through said head.

10. In a burner, a nozzle and a hollow head in such relative position as, coactively, to form an aspirator, said head movable to and from said nozzle and said nozzle discharging through the hollow of said head, and means extending alongside said nozzle for transmitting motion to said head.

11. In a burner, a nozzle and a hollow head in such relative position as, coactively, to form an aspirator, said head movable to and from said nozzle and said nozzle discharging through the hollow of said head, said head carrying a water jacket around its hollow, and means extending alongside said nozzle to conduct coolant to said water jacket and for transmitting motion to said head.

12. In a burner, a nozzle and telescopic hollow heads in such relative position as, coactively, to form an aspirator with lateral openings at intervals, said heads carrying water jackets around their respective hollows and being movable relatively to each other and to said nozzle, and means connected to the respective heads, extending alongside said nozzle to conduct coolant to the respective heads and for transmitting motion to the respective heads.

KENNETH C. McCUTCHEON.